(12) United States Patent
Xu et al.

(10) Patent No.: US 10,116,890 B2
(45) Date of Patent: Oct. 30, 2018

(54) IMAGING APPARATUS AND IMAGING METHOD USING DIFFERENCE BETWEEN RESET SIGNAL AND PIXEL SIGNAL STORED TO TWO CAPACITORS

(71) Applicant: SmartSens Technology (US) Inc., Santa Clara, CA (US)

(72) Inventors: Chen Xu, Santa Clara, CA (US); Zexu Shao, Shanghai (CN)

(73) Assignee: SmartSens Technology (US) Inc., Santa Clara, CA (US)

( * ) Notice: Subject to any disclaimer, the term of this patent is extended or adjusted under 35 U.S.C. 154(b) by 0 days.

(21) Appl. No.: 15/452,291

(22) Filed: Mar. 7, 2017

(65) Prior Publication Data

US 2017/0180660 A1   Jun. 22, 2017

(51) Int. Cl.
*H04N 5/378* (2011.01)
*H04N 5/374* (2011.01)
*H04N 5/357* (2011.01)
*H04N 5/3745* (2011.01)

(52) U.S. Cl.
CPC .......... *H04N 5/374* (2013.01); *H04N 5/3575* (2013.01); *H04N 5/378* (2013.01); *H04N 5/3745* (2013.01); *H04N 5/37452* (2013.01)

(58) Field of Classification Search
CPC .. H04N 5/374; H04N 5/37452; H04N 5/3745; H04N 5/378; H04N 5/3575
See application file for complete search history.

(56) References Cited

U.S. PATENT DOCUMENTS

| 6,384,394 | B1* | 5/2002 | Afghahi | H04N 5/361 |
| | | | | 250/208.1 |
| 2007/0035649 | A1* | 2/2007 | McKee | H01L 27/14609 |
| | | | | 348/308 |
| 2014/0008520 | A1* | 1/2014 | Raynor | H01L 27/14612 |
| | | | | 250/208.1 |
| 2017/0104946 | A1* | 4/2017 | Hong | H04N 5/374 |

* cited by examiner

*Primary Examiner* — Hung H Lam
(74) *Attorney, Agent, or Firm* — Guosheng Wang; United States Research and Patent Firm

(57) ABSTRACT

The present invention relates to an imaging apparatus, including a pixel array comprising a plurality of pixels arranged in rows and columns, wherein at least one of the pixels comprises: a first capacitor configured to store a reset signal, and a second capacitor configured to store a pixel signal; a plurality of column circuits, wherein at least one of the column circuits reads the reset signal from the first capacitor, reads the pixel signal from the second capacitor, and generates difference between the reset signal and the pixel signal, wherein the pixel is configured to store the pixel signal to the second capacitor after the reset signal is stored to the first capacitor.

11 Claims, 14 Drawing Sheets

IMAGING APPARATUS AND IMAGING METHOD USING DIFFERENCE BETWEEN RESET SIGNAL AND PIXEL SIGNAL STORED TO TWO CAPACITORS

CROSS-REFERENCE TO RELATED U.S. APPLICATIONS

This application claims the benefit of priority under the Paris Convention based on Chinese Application No. 201610179373.6 filed on Apr. 29, 2016, the entire disclosures of which is incorporated herein by reference.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

FIELD OF THE INVENTION

The present invention relates to the field of imaging, and particularly to an imaging apparatus, an imaging method thereof, and a method for reading out an image sensor.

BACKGROUND OF THE INVENTION

CMOS image sensors have been widely used in various products such as cell phones, tablet computers, security monitoring systems and the like. In many applications such as industrial camera, machine vision and the like, it is required to capture the objects moving at high speed without distortion, due to the high speed motion of the object and the requirements of image recognition algorithm. Traditional CMOS image sensors with rolling shutter, which read progressively, may generate Jell-O effect on objects moving at high speed and the image may be distorted, and therefore, it is required to use a global shutter.

However, in the existing image sensors with a global shutter, the two read-outs of the image signal and the reset signal are not correlated in a full sense in which the signal is read out before the signal is reset, and thus the noise in the signal cannot be entirely eliminated, which leads to decreased SNR of image. Currently, no solutions are available to address this technical problem.

SUMMARY OF THE INVENTION

The present application is directed to the problems existing in the prior arts. According to one aspect of the present invention, there is provided an imaging apparatus, comprising: a pixel array comprising a plurality of pixels arranged in rows and columns, wherein at least one of the pixels comprises: a first capacitor configured to store a reset signal, and a second capacitor configured to store a pixel signal; a plurality of column circuits, wherein at least one of the column circuits reads the reset signal from the first capacitor, reads the pixel signal from the second capacitor, and generates difference between the reset signal and the pixel signal.

In the aforementioned apparatus, the pixel is configured to store the pixel signal to the second capacitor after the reset signal is stored to the first capacitor.

In the aforementioned apparatus, the pixel further comprises: an output transistor connected between an output transistor of the pixel and the ground.

In the aforementioned apparatus, the pixel further comprises: an output source follower transistor connected to an output of the first capacitor and the second capacitor and a row selection transistor.

In the aforementioned apparatus, the pixel further comprises a reset storage switch connected between an output of the source follower transistor and the first capacitor Crst, and a reset read-out switch connected between the first capacitor and the output source follower transistor.

In the aforementioned apparatus, the pixel further comprises a signal storage switch connected between the output of the source follower transistor and the second capacitor, and a signal read-out switch connected between the second capacitor and the output source follower transistor.

In the aforementioned apparatus, the pixel further comprises a reset storage switch connected between the output of the source follower transistor and the first capacitor, a signal storage switch, and a signal read-out switch, wherein the signal storage switch is connected between the output of the source follower transistor and the second capacitor, and the signal read-out switch is connected between the second capacitor and the output source follower transistor.

In the aforementioned apparatus, the pixel further comprises a reset storage switch connected between the output of the source follower transistor and the first capacitor, a signal storage switch, a signal read-out switch, wherein the signal storage switch is connected between the output of the source follower transistor and the second capacitor, and the signal read-out switch is connected between the second capacitor and the output source follower transistor, and a storage switch connected between the input of the reset storage switch and the signal storage switch and the source follower transistor.

In the aforementioned apparatus, the column circuit comprises a read-out circuit including: an amplifier, the inverse input terminal of which is connected to the column output line through an input capacitor; a filter capacitor connected between the output terminal and the inverse input terminal of the amplifier; an auto-zeroing switch connected between the output terminal Vout and the inverse input terminal Vinn of the amplifier.

In the aforementioned apparatus, the input capacitor is controlled to be connected to the first capacitor when the column amplifier is in auto-zeroing.

In the aforementioned apparatus, the input capacitor is controlled to be connected to the first capacitor and the second capacitor when the column amplifier is in amplification.

In the aforementioned apparatus, the capacitance of the first capacitor is equal to that of the second capacitor.

In the aforementioned apparatus, the voltage of the inverse input terminal remains unchanged during the period of auto-zeroing and amplification.

In the aforementioned apparatus, the pixel array comprises a first pixel group corresponding to a first transfer voltage, and a second pixel group corresponding to a second transfer voltage.

According to another aspect of the present invention, there is provided an imaging method, which, with respect to at least one of pixels in a pixel array arranged in rows and columns, comprises steps of: resetting a storage area, generating a reset signal, and storing the reset signal to a first storage element; transferring a pixel signal in a photodiode to the storage area, generating a pixel signal, and storing the pixel signal to a second storage element; and obtaining the reset signal and the pixel signal from the first and the second storage elements, and deriving the difference between the reset signal and the pixel signal.

According to a further aspect of the present invention, there is provided a method for reading out an image sensor, comprising steps of: obtaining a charge stored in a first capacitor from a column output line of the pixel array arranged in rows and columns, and accumulating the charge to the input capacitor of the inverse input terminal of the inverse feedback amplifier, wherein the output of the amplifier is directly connected to the inverse input terminal of the amplifier; and obtaining the charge stored in a second capacitor from the column output line, and accumulating the charge to the input capacitor of the inverse input terminal of the inverse feedback amplifier, wherein the output of the amplifier is connected to the inverse input terminal of the amplifier through a filter capacitor, and in the meanwhile, reading out the voltage difference signal between the first capacitor and the second capacitor from the output terminal of the inverse feedback amplifier.

In the aforementioned method, the capacitance of the first capacitor is same as that of the second capacitor.

In the aforementioned method, the voltage of the inverse input terminal of the amplifier remains unchanged when the charge is accumulated to the input capacitor.

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form in order to avoid unnecessarily obscuring the present invention. Other parts may be omitted or merely suggested.

DETAILED DESCRIPTION OF THE PREFERRED EMBODIMENT

Figure 1:
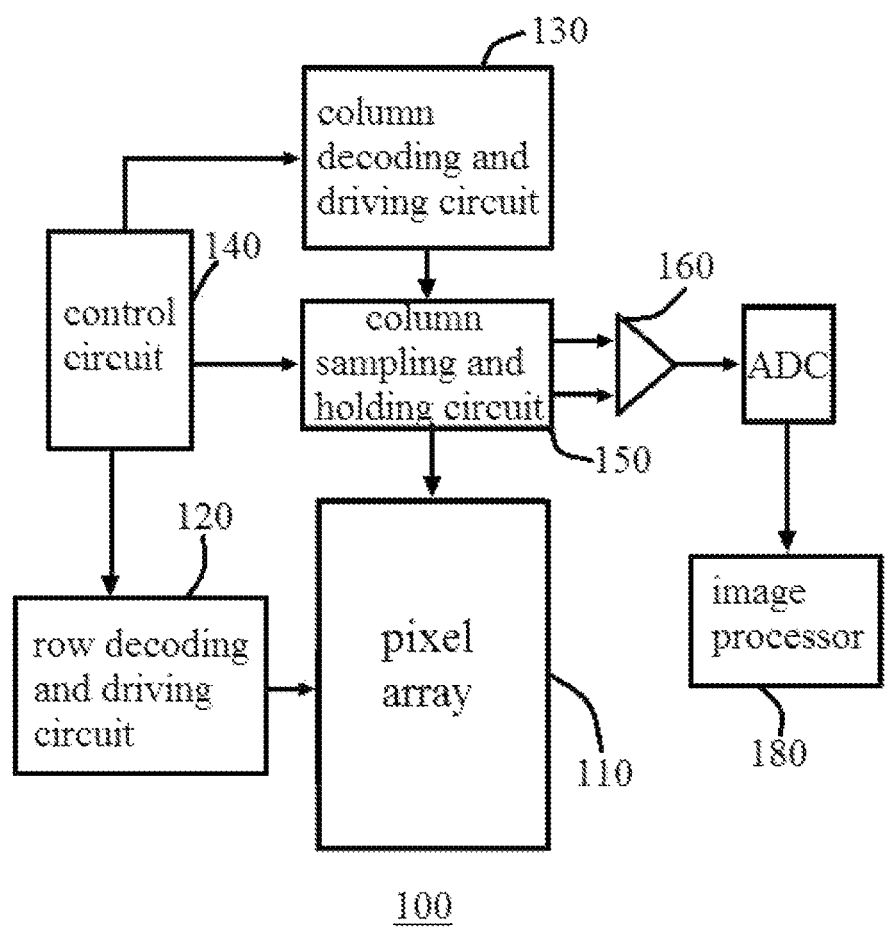
FIG. 1 is a schematic diagram of a structure of an imaging apparatus.

To make objects, technical solutions and advantages of the embodiments of the present invention more clearly, the technical solutions of embodiments of the present invention will now be clearly and fully described with reference to the accompanying drawings. Obviously, the embodiments to be described are only some, and not all, of the embodiments of the present invention. Based on the embodiments of present invention, all the other embodiments that a skilled person would arrive at without inventive efforts shall fall within the scope of protection of the present invention.

In the following detailed description, reference can be made to the accompanying drawings, which as part of the present application serve to illustrate particular embodiments of the present application. In the drawings, like reference numerals refer to generally similar elements. Various particular embodiments of the present application have been described, to such sufficient details that a person of ordinary skill with relevant knowledge and technique in the art can practice the technical solution of the present application. It should be understood that other embodiments can be used, or that structural, logical or electrical changes can be made to the embodiments of the present application.

Figure 2:
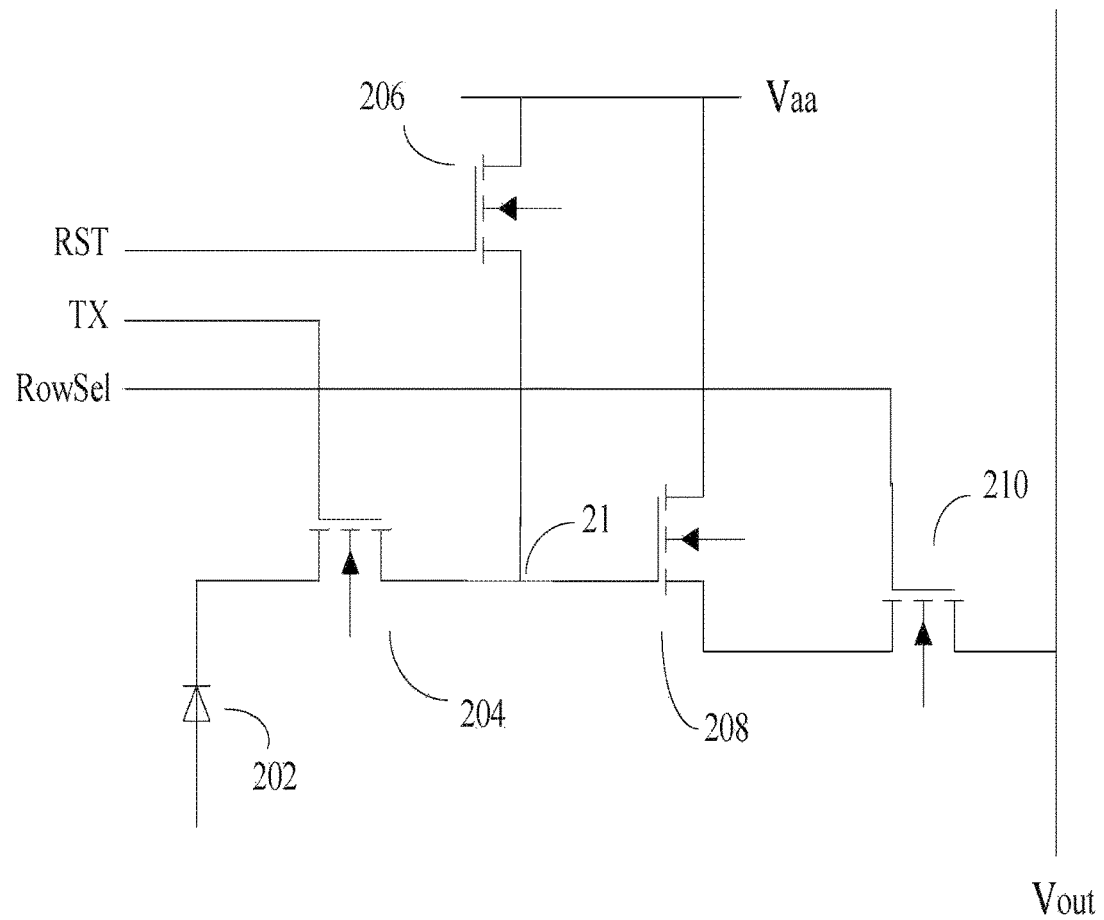
FIG. 2 is a schematic diagram illustrating a representative pixel structure.

The term pixel refers to an electrical element comprising an optic sensor or other devices for converting electromagnetic signals into electric signals. For purpose of illustration, FIG. 1 illustrates a representative imaging apparatus, which includes one pixel array. FIG. 2 illustrates a representative pixel, and all pixels in a pixel array are typically fabricated in a similar way.

FIG. 1 schematically shows the structure of an imaging apparatus 100. The imaging apparatus 100 such as a CMOS imaging apparatus, comprises a pixel array 110. The pixel array 110 comprises a plurality of pixels arranged in rows and columns. The pixels in each column of the pixel array 110 are gated simultaneously by a column selection line, and the pixels in each row are selectively output by a row selection line, respectively. Each of the pixels has a row address and a column address. The column address of the pixels corresponds to the column selection line driven by a column decoding and driving circuit 130, and the row address of the pixels corresponds to the row selection line driven by a row decoding and driving circuit 120. A control circuit 140 controls the column decoding and driving circuit 130 and the row decoding and driving circuit 120, so as to selectively read out the pixel output signal corresponding to a proper row or column in the pixel array.

The pixel output signal comprises a pixel reset signal $V_{rst}$ and a pixel image signal $V_{sig}$. The pixel reset signal $V_{rst}$ represents the signal obtained from a floating diffusion region when the floating diffusion region of the photosensitive device (such as a photodiode) is reset. The pixel image signal $V_{sig}$ represents a signal obtained from the charge of the representative image obtained by the photosensitive device transferring to the floating diffusion region. The pixel reset signal $V_{rst}$ and the pixel image signal $V_{sig}$ are both read out by the column sample and hold circuit 150, and performs subtraction through the differential amplifier 160. The signal $V_{rst}$-$V_{sig}$ outputted from the differential amplifier 160 represents the image signal obtained by the photosensitive device. The image signal is converted into a digital signal through an AD converter ADC 170, and further processed by image processor 180 to output a digitized image.

FIG. 2 is a schematic diagram illustrating a representative pixel structure. The pixel 200 in FIG. 2 comprises a photodiode 202, a transfer transistor 204, a reset transistor 206, a source follower transistor 208 and a row selection transistor 210. The photodiode 202 is connected to the source of transfer transistor 204. The transfer transistor 204 is controlled by a signal TX. When TX controls the transfer transistor to be in 'on' state, the charges accumulated in the photodiode are transferred to the storage area 21. In the meanwhile, the photodiode 202 is reset. The gate of the source follower transistor 208 is connected to the storage area 21. The source follower transistor 208 amplifies the signal received from storage area 21. The source of the reset transistor 206 is also connected to the storage area 21. The reset transistor 206 is controlled by a signal RST for resetting the storage area 21. The pixel 200 further comprises the row selection transistor 210. The row selection transistor 210 is controlled by a signal RowSel, and outputs the signal amplified by source follower transistor 208 to an output line Vout.

Figure 3:
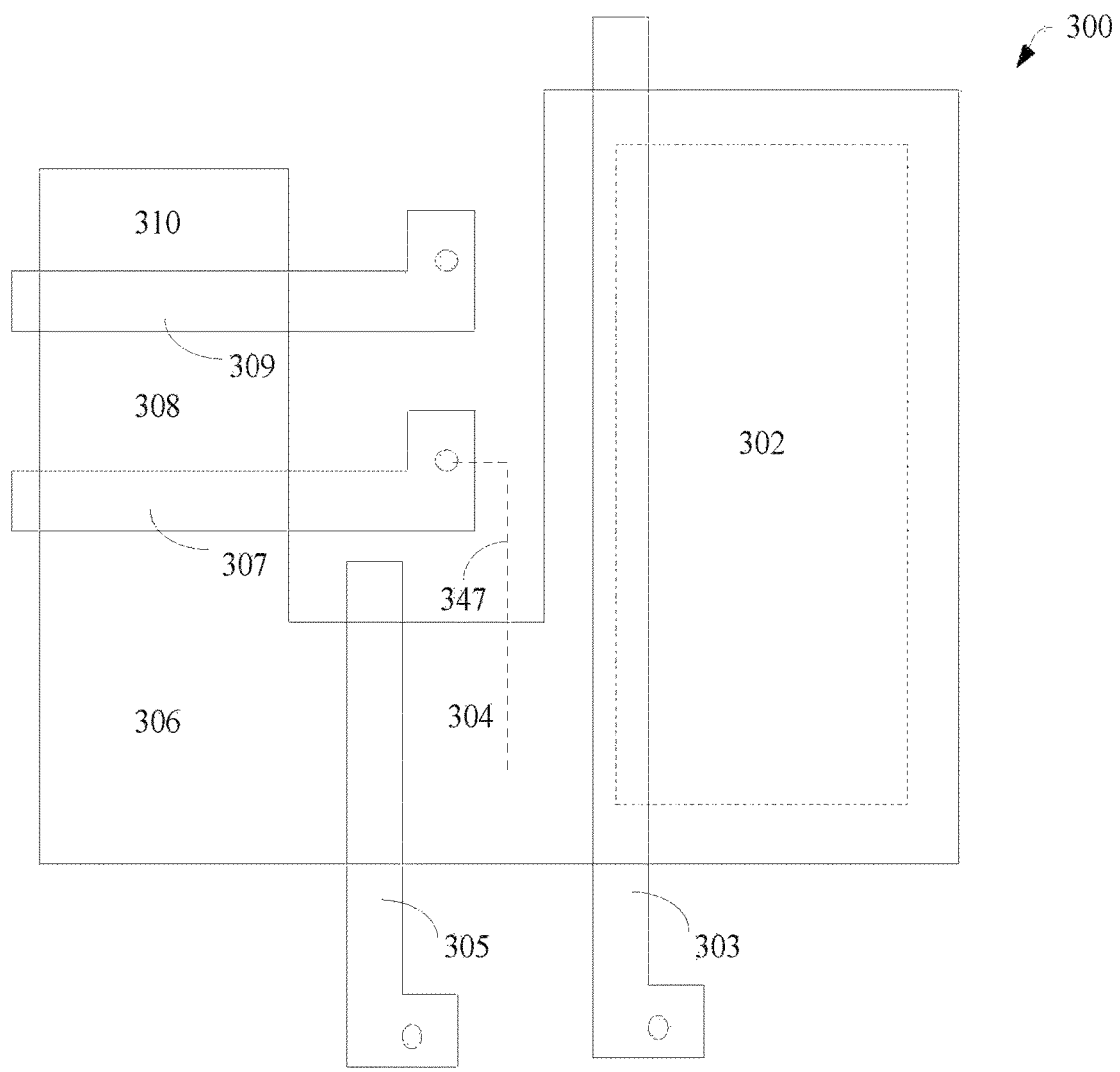
FIG. 3 is a schematic diagram illustrating a representative pixel structure.

FIG. 3 is also a schematic diagram illustrating a representative pixel structure. FIG. 3 is not a schematic diagram of abstract circuit logic, but a schematic diagram of a specific structure of semiconductor. The pixel 300 in FIG. 3 comprises a photodiode 302 as a photosensitive device. The pixel 300 comprises a transfer gate 303, which forms a transfer transistor together with the photodiode 302 and a storage area, i.e. a floating diffusion region 304. The pixel 300 also comprises a reset gate 305, which is connected between the floating diffusion region 304 and an active area 306, for resetting the floating diffusion region 304. The active area 306 is connected to a voltage source Vaa. The pixel 300 further comprises a source follower gate 307, which is connected between the active areas 306 and 308 to form a source follower transistor, and the source follower gate 307 is electrically coupled to the floating diffusion region 304 through an electric connection 347. The pixel 300 further comprises a row selection transistor gate 309, which is connected between the active area 308 and the active area 310 as an output of the pixel to form a row selection transistor.

The source area/drain area, the floating diffusion region, the channel area located at the next stage of the gate between the source/drain area of the above transistors and the photodiodes are defined as the active area due to their doping, which defines the active electric apparatus in combination with the gate structure.

In view of the problems existing in the prior arts, the present invention introduces a circuit structure based on column parallel reading structure.

Figure 4:
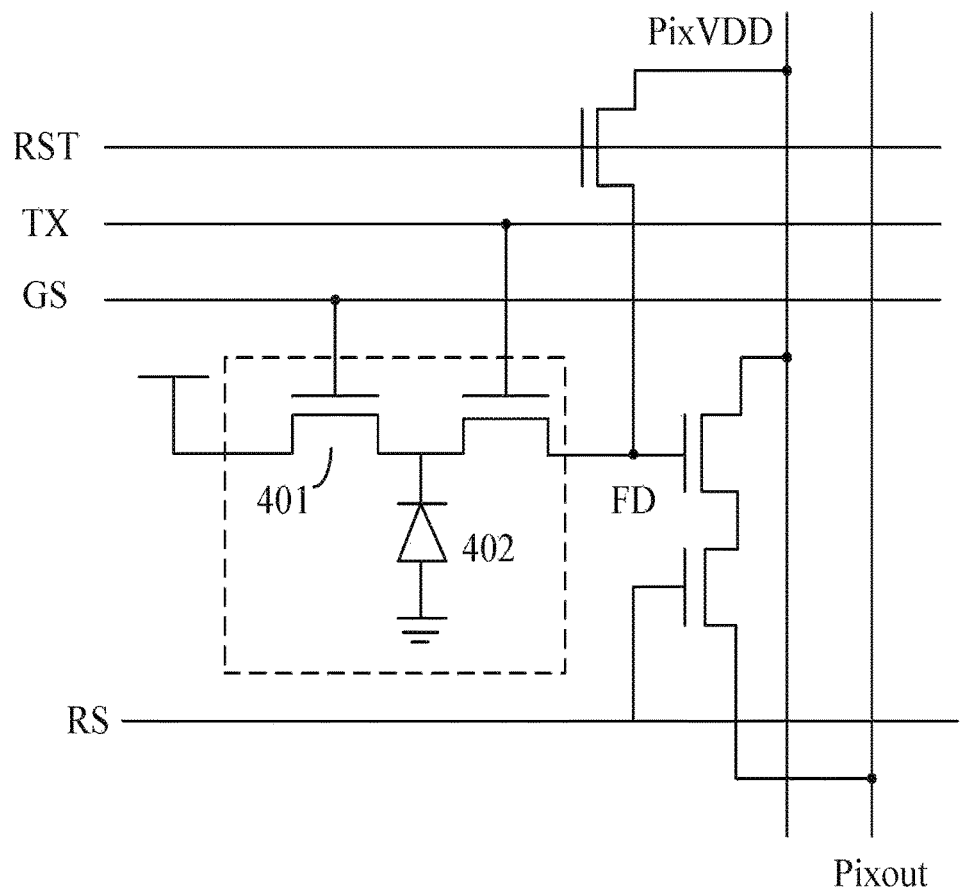
FIG. 4 is a schematic diagram of a pixel structure of an image sensor with global shutter of prior art.
Figure 5:
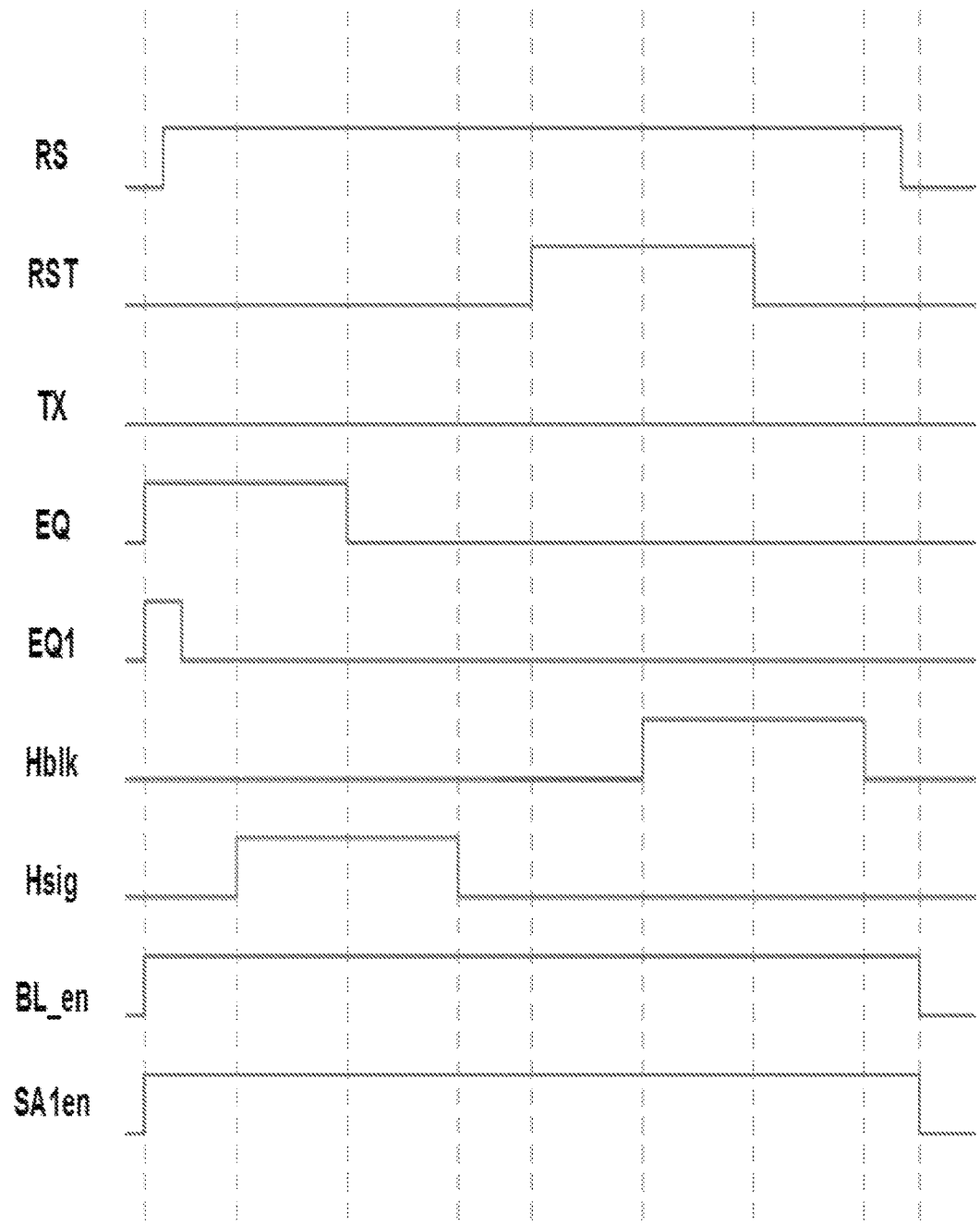
FIG. 5 is a timing chart of signal read-out of the image sensor with global shutter of prior art.

FIG. 4 is a schematic diagram of a pixel structure of an image sensor with global shutter of prior art. FIG. 5 is a timing chart of signal read-out of the image sensor with global shutter of prior art. With reference to FIGS. 4 and 5, on the basis of the traditional pixel structure, a global shutter transistor 401 is added to each of the pixels, which is configured to be controlled by a global shutter (GS) signal. The global shutter transistor 401 is connected to the photodiode 202, so as to control the exposure time of photodiode 402 under the control of GS signal. In the existing image sensor with global shutter, since both the pixel exposure controlled by the GS signal and the read-out controlled by the TX signal are in global mode, when the integration in timing is completed (i.e. at end of the photodiode exposure), the TX is turned on globally, and the signal is firstly stored in the capacitor of FD. With reference to FIG. 5, when the signal is read out, the row selection signal RS is turned on, the pixel signal (i.e. 'signal' signal) is firstly read out. Then the RST signal resets the voltage of FD, and after that, the reset signal (i.e. 'reset' signal) is read out. As the read-out of the pixel signal occurs before the RST signal resets the FD, these two read-outs are not correlated in the full sense. As such, the noise cannot be completely eliminated in the subsequent reverse correlating operation. Consequently, the signal-noise-ratio of the image obtained through the traditional image sensor with the global shutter is reduced.

Figure 6:
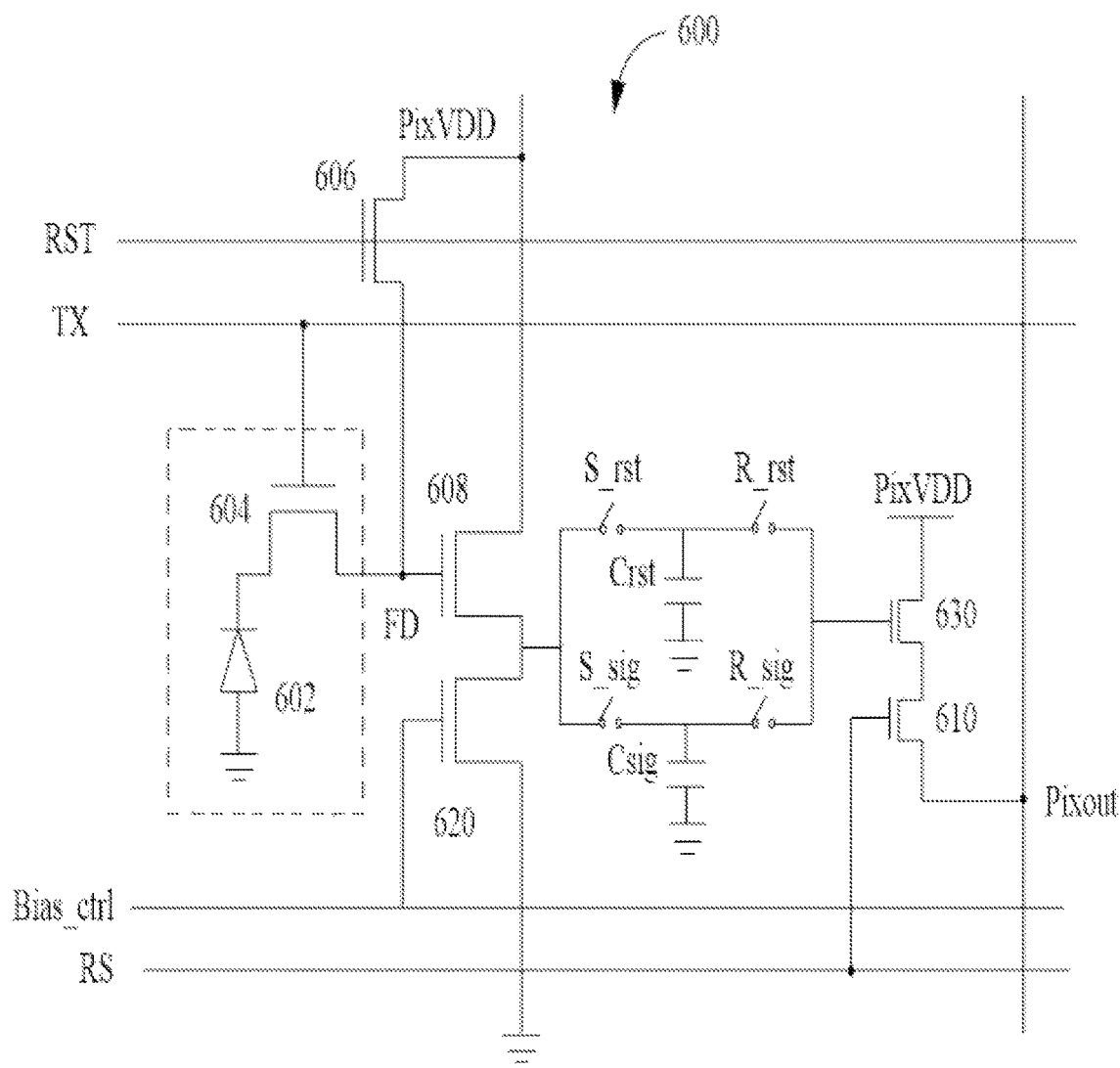
FIG. 6 is a schematic diagram of a pixel structure according to one embodiment of the present invention.

FIG. 6 is a schematic diagram of a pixel structure according to one embodiment of the present invention. The functions of the respective elements in FIG. 6 are similar with those of corresponding elements in FIG. 4, and their differences are specifically described as follows. As shown in FIG. 6, on the basis of existing pixel structure, a capacitor Crst for storing a 'reset' signal and a capacitor Csig for storing a 'signal' signal are added to the pixel 600. The 'reset' and 'signal' signals are respectively stored to the capacitors Crst and Csig after the FD area is reset by the RST signal, to ensure the correlation of those two signals. With the two storage units of the capacitors Crst and Csig, at the end of the global exposure, the pixel can be read out at timing of a full correlation sampling. These two signals will be subtracted from each other in a subsequent column reading circuit to achieve the effect of correlated double sampling (CDS).

According to one embodiment of the present invention, the pixel 600 further comprises an output transistor 620, which is connected between a source follower transistor 608 and the ground, and controlled by a bias control signal Bias_ctrl. When the 'reset' and 'signal' signals are read out and stored to the capacitors Crst and Csig, an output transistor 620 is in off state to ensure the storage of the signals. After that, the output transistor 620 grounds the output of source follower transistor 608 to reduce the inference when the 'reset' and 'signal' signals are read out, and to ensure auto-zeroing.

According to one embodiment of the present invention, the pixel 600 further comprises an output source follower transistor 630, which is connected between an output of capacitors Crst and Csig, and a row selection transistor 610, to form a row output circuit so as to provide an output signal.

According to one embodiment of the present invention, the pixel 600 further comprises a reset storage switch S_rst and a reset read-out switch R_rst, wherein the reset storage switch S_rst is connected between the output of source follower transistor 608 and the reset storage capacitor Crst, and the reset read-out switch R_rst is connected between the reset storage capacitor Crst and the output source follower transistor 630.

According to one embodiment of the present invention, the pixel 600 further comprises a pixel signal storage switch S_sig and a pixel signal read-out switch R_sig, wherein a pixel signal storage switch S_sig is connected between the output of source follower transistor 608 and the signal storage capacitor Csig, and a pixel signal read-out switch R_sig is connected between the pixel signal storage capacitor Csig and the output source follower transistor 630.

Figure 7:
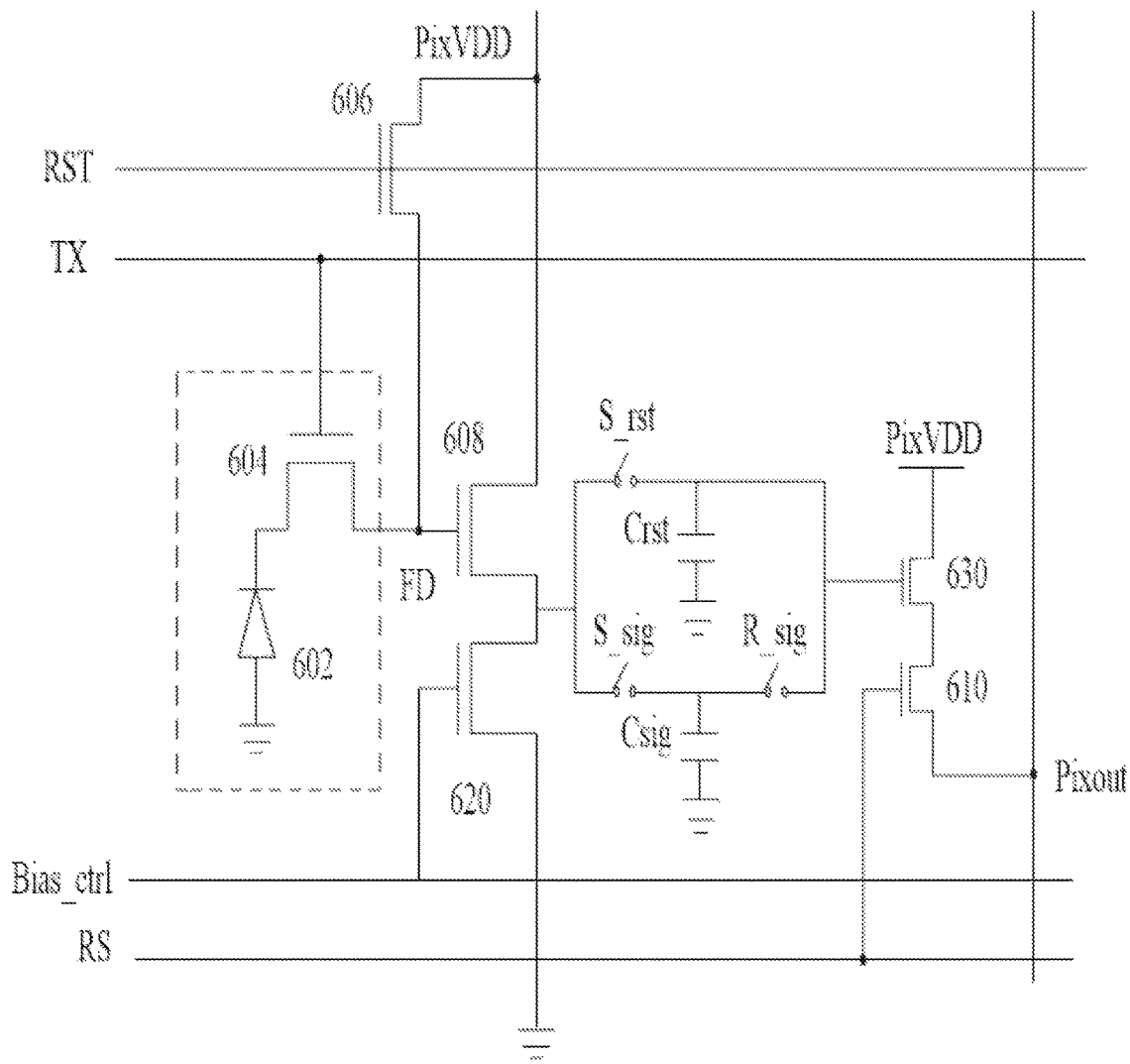
FIG. 7 is a schematic diagram of pixel architecture according to another embodiment of the present application.

FIG. 7 is a schematic diagram of pixel architecture according to another embodiment of the present application. The reference numbers and functions of the elements shown in FIG. 7 are substantially same as those shown in FIG. 6, and will not be redundantly described. In the pixel 700 shown in FIG. 7, the reset read-out switch R_rst is omitted. That is, after the reset storage switch S_rst is switched on and the charge is transferred to the reset storage capacitor Crst, the S_rst is switched off. The switch off of the S_rst will directly trigger the read-out of the reset storage capacitor Crst without waiting for the switch-on of the reset read-out switch R_rst.

Figure 8:
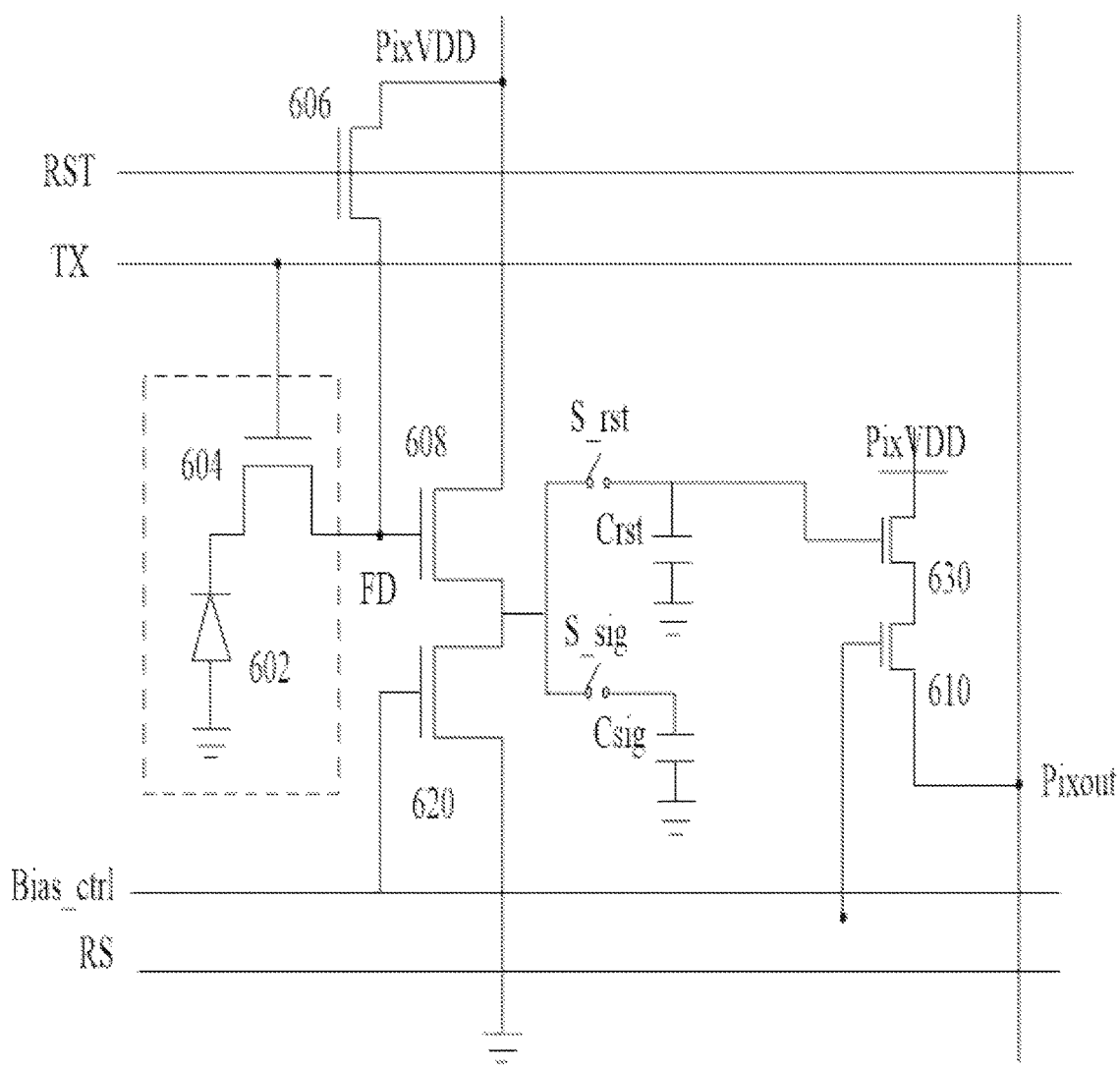
FIG. 8 is a schematic diagram of pixel structure according to another embodiment of the present application.

FIG. 8 is a schematic diagram of pixel structure according to another embodiment of the present application. The reference numbers and functions of the elements shown in FIG. 8 are substantially same as those shown in FIG. 6, and will not be redundantly described. In the pixel 800 shown in FIG. 8, the reset read-out switch R_rst and the signal read-out switch R_sig are omitted, and there is added a storage switch SW, which is connected between the input of the reset storage switch S_rst and the signal storage switch S_sig, and the source follower transistor 808, while the signal storage capacitor Csig is no longer independently connected to the row output circuit. When the signals rst and sig are stored, ON and OFF of the SW are maintained to be constant with those of the reset storage switch S_rst and the signal storage switch S_sig. When the Crst 和 Csig are read out, the reset storage switch S_rst and the signal storage switch S_sig are connected to the row output circuit respectively, and the functions of the reset read-out switch R_rst and the signal read-out switch R_sig are realized.

Figure 9:
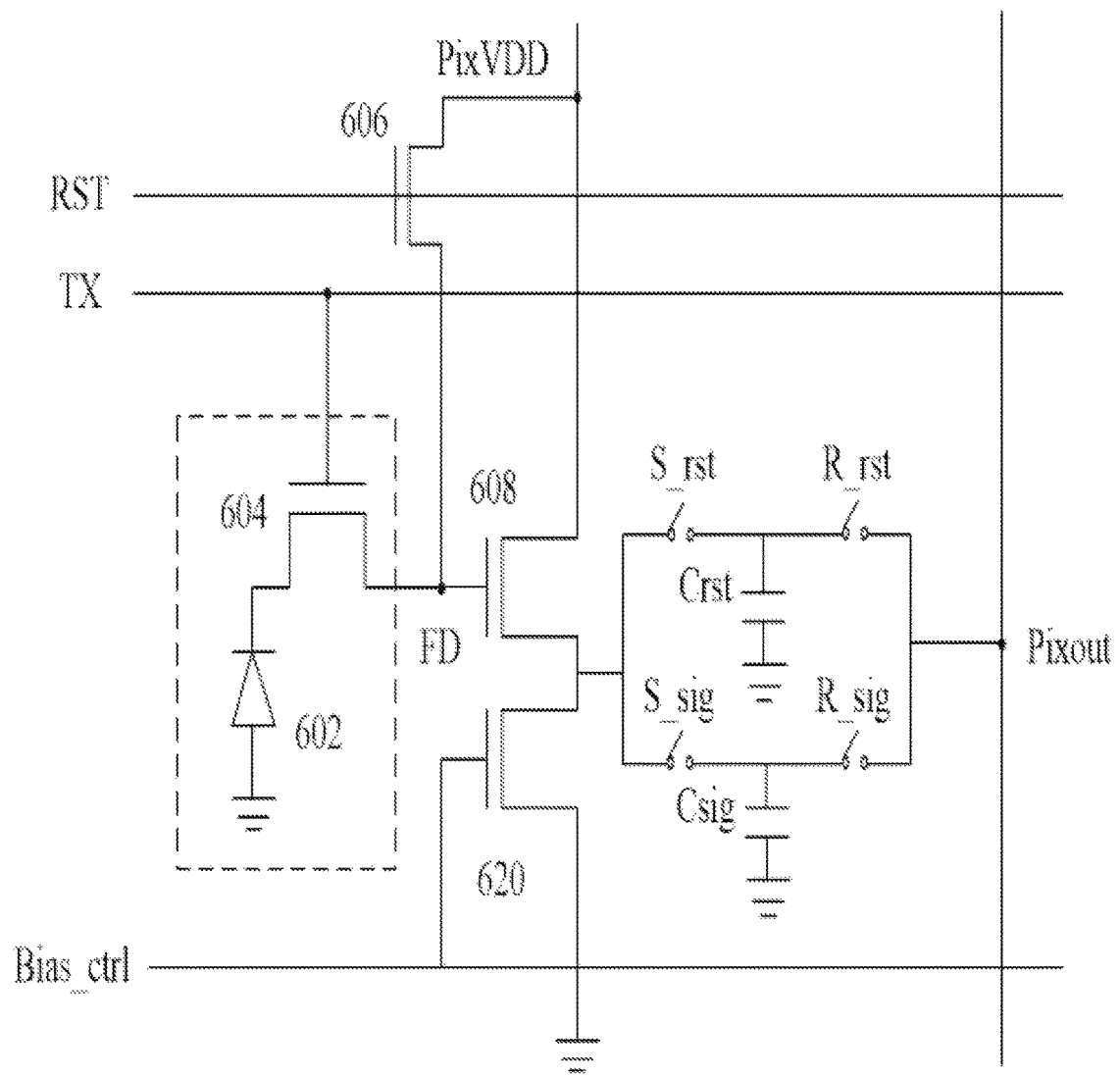
FIG. 9 is a schematic diagram of pixel structure according to another embodiment of the present application.

FIG. 9 is a schematic diagram of pixel structure according to another embodiment of the present application. The reference numbers and functions of the elements shown in FIG. 9 are substantially same as those shown in FIG. 6, and will not be redundantly described. The pixel 900 shown in FIG. 9 is of a simplified structure, which is similar to that of the Passive Pixel Sensor (PPS). In the pixel 900, the row output circuit is omitted, and the row selection signal is not provided either. The charge integrating amplifier read-out circuit connected to the Capacitors Crst and Csig maintains the voltage of column line to be a constant. When the signal stored in the capacitor Crst or Csig is read out, the voltage thereof is reset to a voltage level of the column line. In the meanwhile, the charge proportion to the light signal is converted by the charge integrating amplifier to the charge for output, and thus the read-out the signal is realized.

Figure 10:
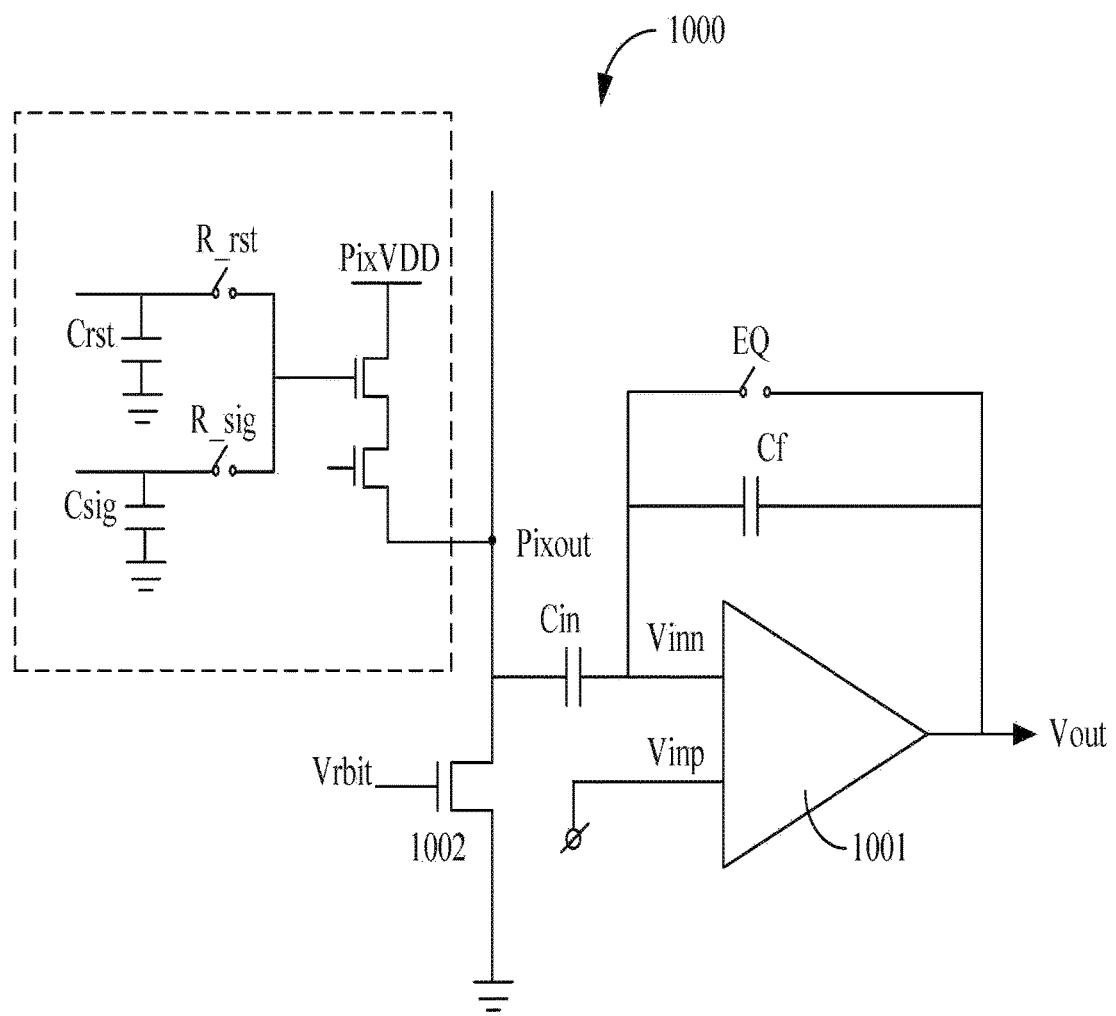
FIG. 10 is a schematic diagram of a structure of a read-out circuit according to one embodiment of the present application.
Figure 11:
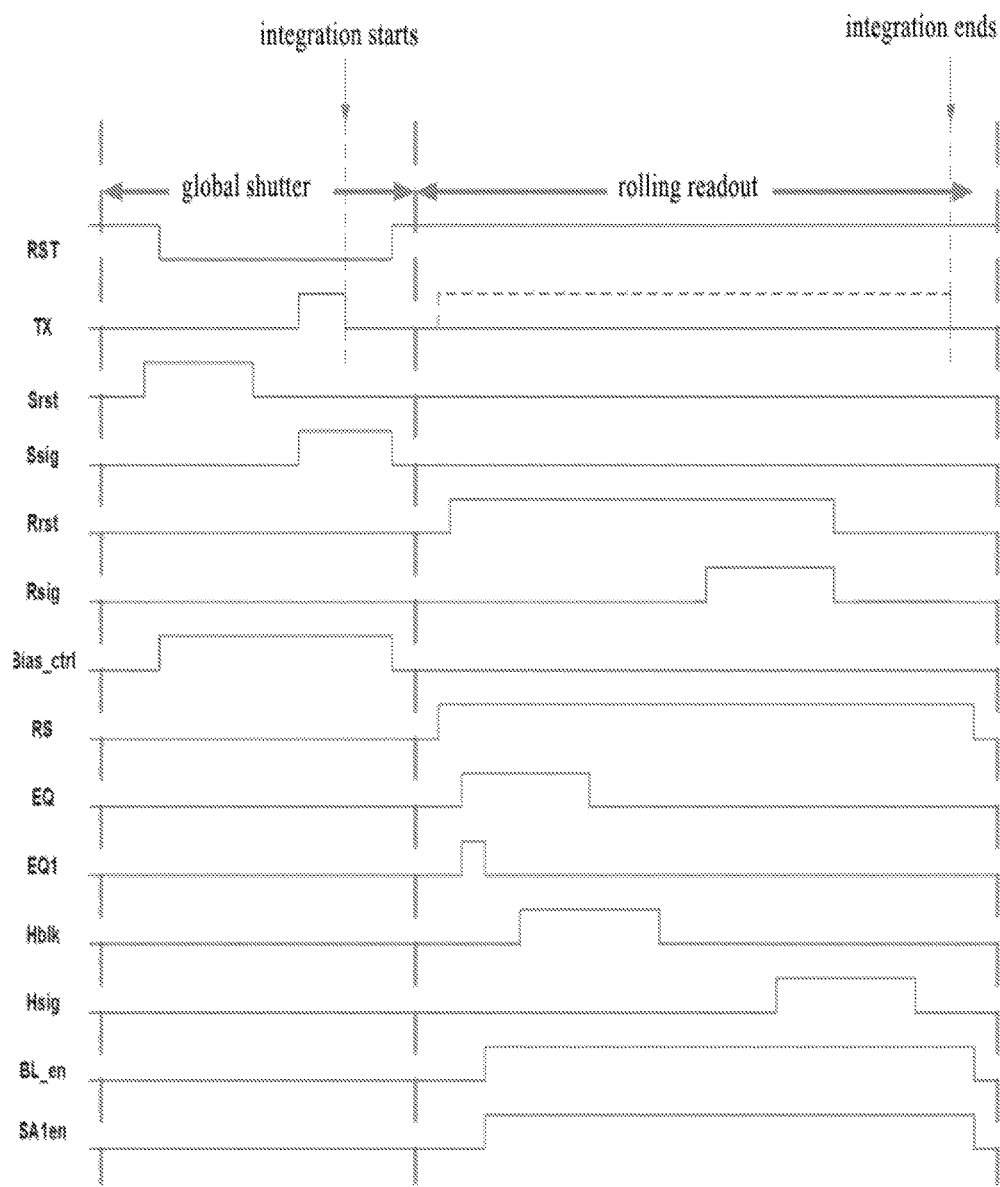
FIG. 11 is a timing chart of signals for pixel sampling and read-out according to one embodiment of the present application.

FIG. 10 is a schematic diagram of a structure of a read-out circuit according to one embodiment of the present application. FIG. 11 is a timing chart of signals for pixel sampling and read-out according to one embodiment of the present application. The embodiments shown in FIGS. 10 and 11 can also apply to the pixel structure shown in FIG. 6. Of course, those skilled in the art shall appreciate that, the embodiments shown in FIGS. 10 and 11 can be also modified correspondingly, so as to be applied to the pixel structures shown in FIGS. 7 to 9, which will be not reluctantly explained. Further, those skilled in the art shall appreciate that, FIG. 10 is one embodiment of the signal processing of the full correlated double sampling for the purpose of explanation. All the other ways of signal processing in which a similar function can be realized also fall within the scope of the present application.

With reference to FIGS. 6 and 10, the read-out circuit shown in FIG. 10 comprises an amplifier 1001. The inverse input terminal Vinn of the amplifier 1001 is connected to a column output line Pixout of the pixel 600 through an input capacitor (integrating capacitor). The positive input terminal Vinp of the amplifier 1001 is connected to a reference voltage Vref. The AC filter capacitor Cf is connected between the output terminal and the inverse input terminal Vinn of the amplifier 1001, and the switch EQ and the capacitor Cf are connected in parallel with each other between the output terminal and the inverse input terminal Vinn of the amplifier 1001.

According to one embodiment of the present application, a column output line Pixout is grounded through a transistor 1002 controlled by a signal Vrbit. When the column output line Pixout transfers the charge to the input capacitor, or the charge in the input capacitor is redistributed, the signal Vrbit controls the transistor 1002 to be in the off state, so as to facilitate conversion of the charge and reduction of the noise. After the read-out of the pixel signal is completed, the signal Vrbit controls the transistor 1002 to be in the on state, and the column output line Pixout is reset.

With reference to FIG. 11, the read-out process in which the double correlated sampling is realized according to an embodiment of the present application.

During the global shuttering in which the reset signal reset and the pixel signal signal are stored, this process is generally similar to the existing read-out process of the reset signal reset and the pixel signal signal, with the exception that the results of the read-outs are stored to the respective capacitors Crst and Csig, rather than outputted via the output line. Specifically, the RST signal resets the FD area, and the signal reset is generated. In this case, the signal Srst is at high level and the signal Ssig is at low level, and the signal reset is stored to the capacitor Crst. Then, the signal Tx is at high level, and the charge in the photodiode is transferred to the FD area and the signal signal is generated. In this case, the signal Ssig is at high level and the signal Srst is at low level, and the signal signal is stored to the capacitor Csig.

During the period when the signal is progressively read out (rolling read-out), at the beginning, the signal Rrst is at high level and the signal Rsig is at low level, only the capacitor Crst is connected to the capacitor Cin. And during the period when the signal Rrst is at high level, the signal EQ is also at high level, which means that the column amplifier is at the auto-zeroing stage.

The charge in the input capacitor Cin is expressed by the following equation.

$$Q1=(Vinn1-Vrst) \times A_{SF} Cin \quad (1)$$

where Q1 indicates the charge in the capacitor Cin, Vinn1 indicates the voltage of the inverse input terminal of the amplifier, Vrst indicates the voltage in the capacitor Crsf, $A_{SF}$ indicates the closed-loop gain of negative feedback of the amplifier, and Cin indicates the capacitance of the input capacitor.

During the period when the signal Rsig is at high level, EQ is at low level, which means that the column amplifier is at amplification operation period. Those skilled in the art shall note that, in this case, the signal Rrst remains at low level. Therefore, there is an average operation between the charges signal and reset in the pixel. In this case, the charge in the input capacitor Cin is expressed by the following equation.

$$Q2 = \left(Vinn2 - \frac{VrstCrst + VsigCsig}{Crst + Csig} \times A_{SF}\right)Cin + (Vinn2 - Vout)Cf \quad (2)$$

where Q2 indicates the charge in the capacitor Cin, Vinn2 indicates the voltage of the inverse input terminal of the amplifier, Vrst indicates the voltage in the capacitor Crst, Vrst indicates the voltage in the capacitor Vrst, Vout indicates the output voltage of the amplifier, and Cf indicates the capacitance of the filter capacitor.

By way of selecting a suitable capacitor, Crst is equal to Csig, the above equation can be simplified as follows.

$$Q2 = \left(Vinn2 - \frac{Vrst + Vsig}{2} \times A_{SF}\right)Cin + (Vinn2 - Vout)Cf \quad (3)$$

Because the column amplifier is in feedback operation state, the voltage of the inverse input terminal remains unchanged, i.e., Vinn1=Vinn2. Further, with law of conservation of electric charge, Q1=Q2, and thus the above equation is modified as follows.

$$(Vref - Vrst) \times A_{SF} Cin = \quad (4)$$
$$\left(Vref - \frac{Vrst + Vsig}{2} \times A_{SF}\right)Cin + (Vref - Vout)Cf$$

From the above equation, Vout can be derived as follows:

$$Vout = \frac{Vrst - Vsig}{2} \times A_{SF} \frac{Cin}{Cf} + Vref \quad (5)$$

where $$A_{SF} \frac{Cin}{Cf}$$

indicates the voltage amplification factor on analog signal chain.

From the above equation, it can be seen that, at output terminal of the column amplifier, the correlated double sampling (CDS) is well done. The relevant noise components such as kTC, 1/f, and VT difference between Rst transistors can be well eliminated. Therefore, in the signal obtained from the above embodiments of the present application, the noise is substantially decreased, and the signal-noise-ratio of the image is considerably increased, and thus the final resultant image quality is also better.

Figure 12:
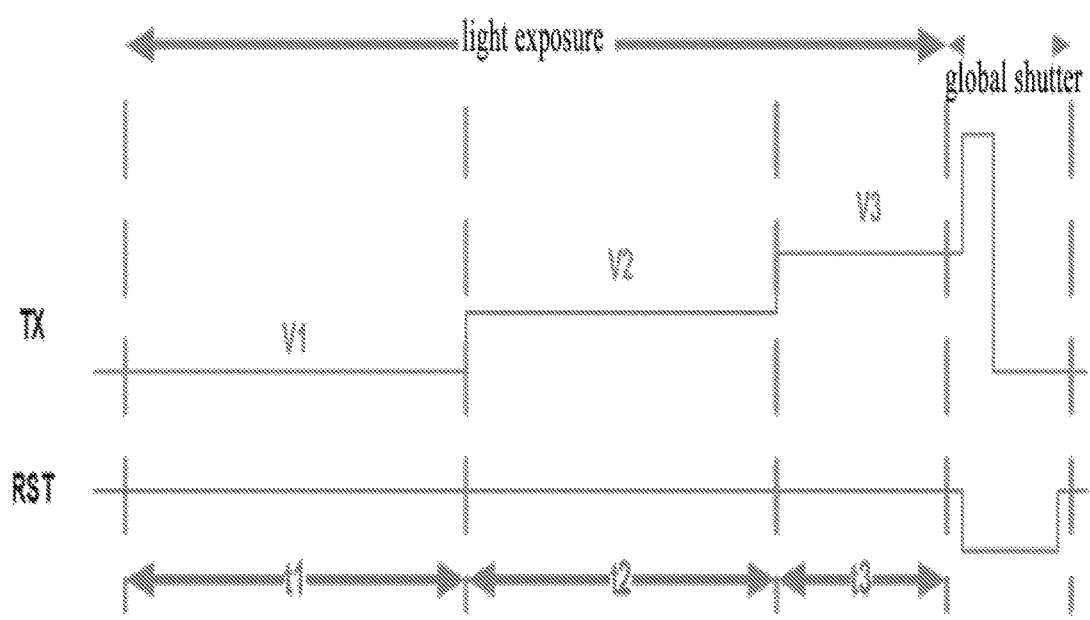
FIG. 12 is a schematic diagram for obtaining a wide dynamic range by controlling the voltage on Tx according to an embodiment of the present application.

According to an embodiment of the present application, at time of the pixel integration, because the pixel is separated from the reset capacitor through the on and/or off of S_rst and S_sig, the pixel integration can directly start from the timing of global shutter. Moreover, a wide dynamic range can be realized by controlling the voltage on Tx during the exposure. FIG. 12 is a schematic diagram for obtaining a wide dynamic range by controlling the voltage on Tx according to an embodiment of the present application. As shown in FIG. 12, TX has different amplitude values lasting for a certain time, and the different amplitude values correspond to different groups of the pixels in the image sensor, respectively, such that the different groups of the pixels in the image sensor transfer charges to FD at different timing, which are further stored in Csig. As such, the different groups of the pixels in the image sensor have different exposure times. As shown in FIG. 12, the exposure time of the pixel group for transfer voltage V1 is t1, the exposure time of the pixel group for transfer voltage V2 is t1+t2, and the exposure time of the pixel group for transfer voltage V3 is t1+t2+t3. Since the saturations of the photodiodes corresponding to different exposure times are different, the obtained image can have a wider dynamic range.

Figure 13:
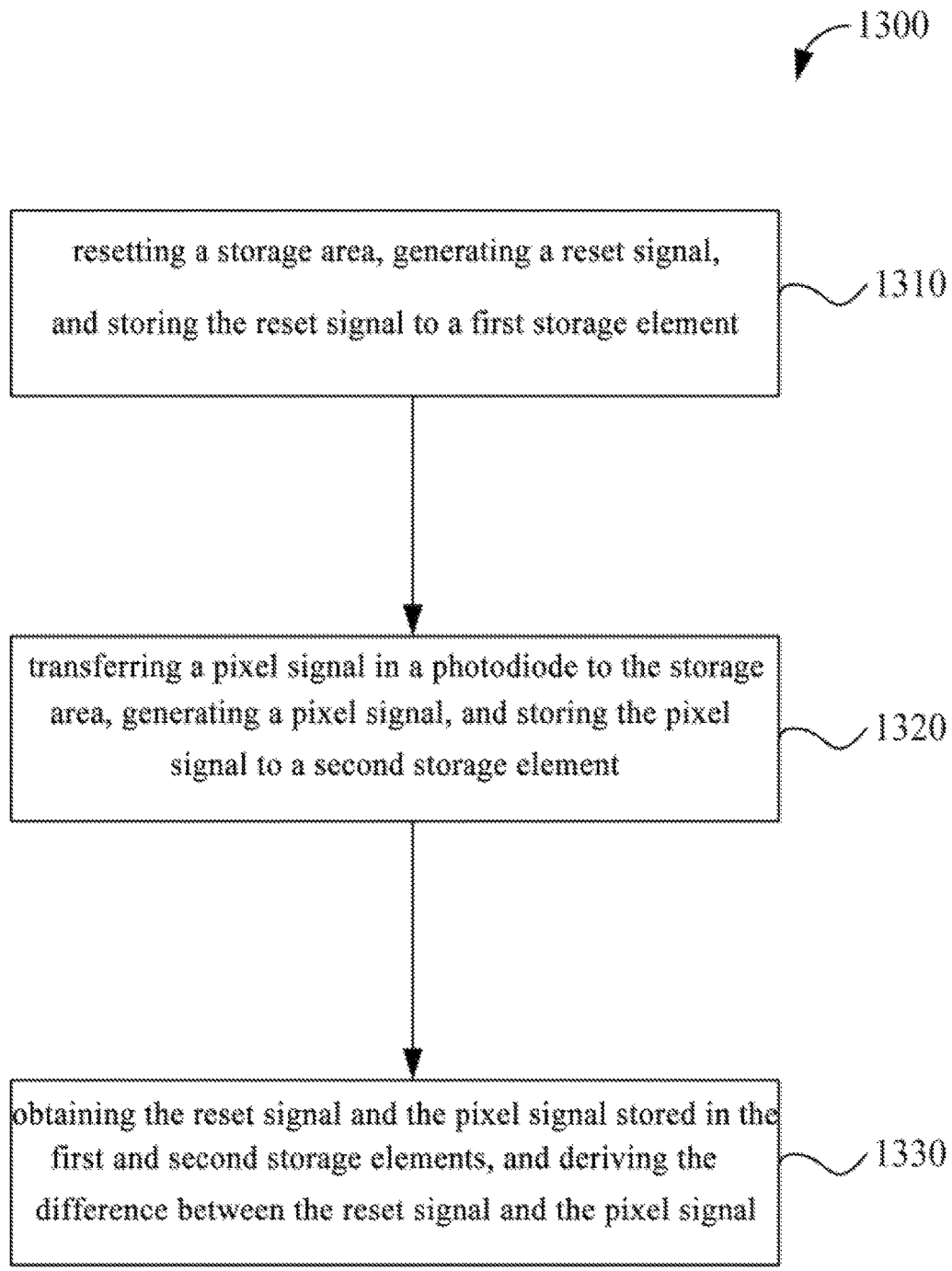
FIG. 13 is a schematic diagram of an imaging method according to an embodiment of the present invention.

FIG. 13 is a schematic diagram of an imaging method according to an embodiment of the present invention. As shown in FIG. 13, an imaging method 1300 comprises steps of: in a pixel array arranged in rows and columns, for at least one of the pixels, at step 1310, resetting a storage area, generating a reset signal, and storing the reset signal to a first storage element; in step 1320, transferring a pixel signal in a photodiode to the storage area, generating a pixel signal, and storing the pixel signal to a second storage element; and in step 1330, obtaining the reset signal and the pixel signal stored in the first and second storage elements, and deriving the difference between the reset signal and the pixel signal.

Figure 14:
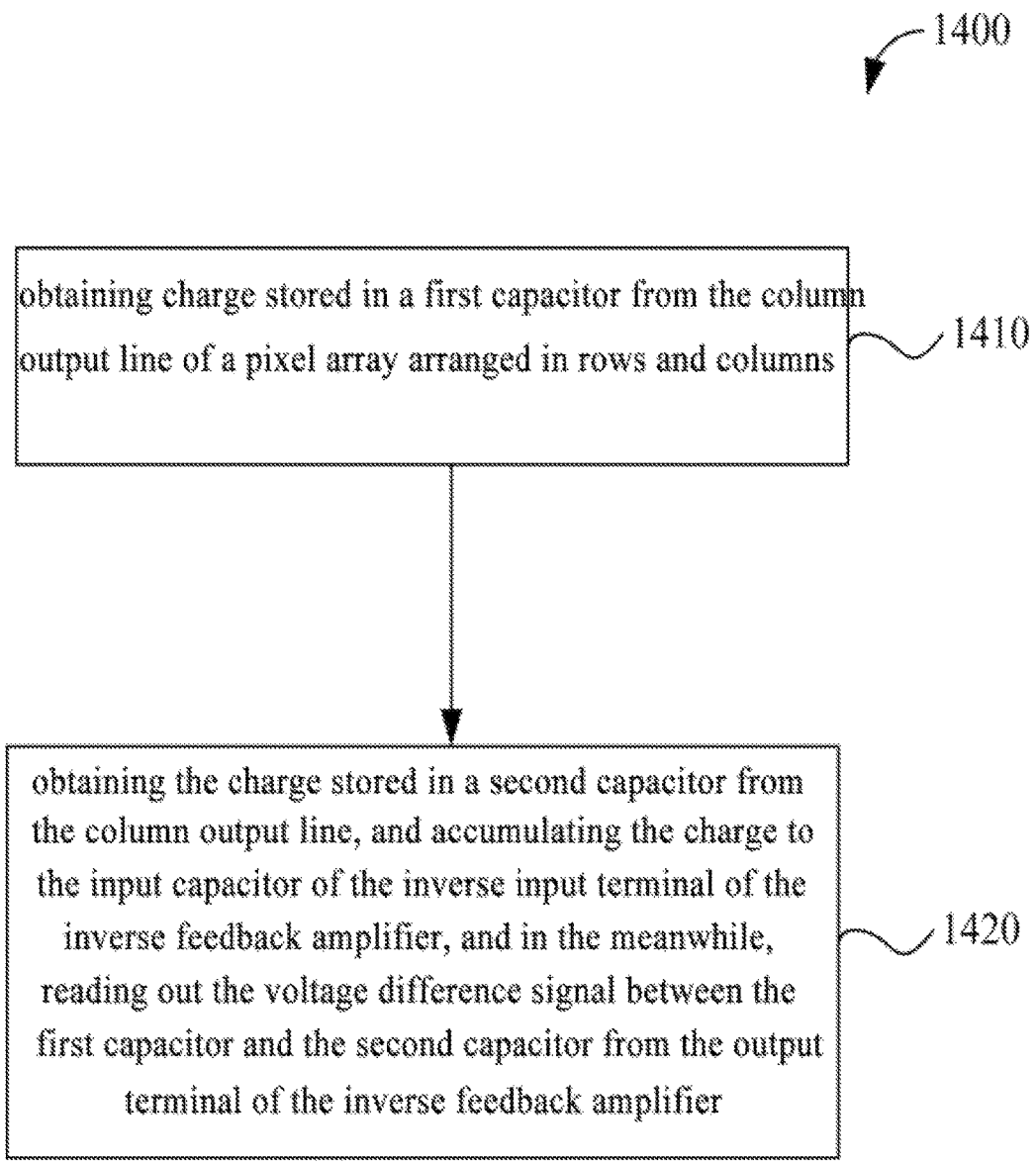
FIG. 14 is a schematic diagram of read-out method of an image sensor according to an embodiment of the present invention.

FIG. 14 is a schematic diagram of read-out method of an image sensor according to an embodiment of the present invention. As shown in FIG. 14, the read-out method 1400 comprises steps of: at step 1410, obtaining charge stored in a first capacitor from the column output line of a pixel array arranged in rows and columns, and accumulating the charge to the input capacitor of the inverse input terminal of the inverse feedback amplifier, where the output of the amplifier is directly connected to the inverse input terminal of the amplifier; and at step 1420, obtaining the charge stored in a second capacitor from the column output line, and accumulating the charge to the input capacitor of the inverse input terminal of the inverse feedback amplifier, where the output of the amplifier is connected to the inverse input terminal through the filter capacitor, and in the meanwhile, reading out the voltage difference signal between the first capacitor and the second capacitor from the output terminal of the inverse feedback amplifier.

According to one embodiment of the present application, the capacitance of the first capacitor is same as that of the second capacitor. According to one embodiment of the present application, the voltage of the inverse input terminal of the amplifier remains unchanged when the charge is accumulated to the input capacitor.

Finally, it should be explained that, the above embodiments are only used for explaining the technical solution of present invention, and not for limitation thereto. Although the present invention has been explained in details with reference to the preferred embodiments, it should be understood by those skilled in the art that modifications and equivalent alternations can be made to the technical solution of present invention, and these modifications and equivalent alternations cannot depart the modified technical solution from the spirit and scope of the technical solution of present invention.

The invention claimed is:
1. An imaging apparatus, comprising:
a pixel array, comprising a plurality of pixels arranged in rows and columns and a column output line, wherein at least one of the pixels comprises: an output transistor, a first capacitor configured to store a reset signal, and a second capacitor configured to store a pixel signal; a plurality of column circuits, wherein at least one of the column circuits reads the reset signal from the first capacitor, reads the pixel signal from the second capacitor, and generates difference between the reset signal and the pixel signal, wherein the pixel is configured to store the pixel signal to the second capacitor after the reset signal is stored to the first capacitor, wherein the output transistor is connected between a source follower transistor and the ground, and controlled by a bias control signal; and when 'reset' and 'signal' signals are read out and stored to the first and second capacitors, the output transistor is in turned off state to ensure the storage of the signals, and after that, the output transistor grounds an output of source follower transistor to reduce the inference when the 'reset' and 'signal' signals are read out, and to ensure autozeroing;

wherein a charge stored in the first capacitor is obtained through the column output line, and a charge stored in the second capacitor is obtained through the column output line, and wherein the column output line is grounded through a transistor 1002 controlled by a signal Vrbit; when the column output line transfers a charge to an input capacitor, or an charge in an input capacitor is redistributed, the signal Vrbit controls the transistor 1QQ2 to be in the off state, so as to facilitate conversion of the charge and reduction of the noise; and wherein after a read out of the pixel signal is completed, the signal Vrbit controls the transistor 1002 to be in the off state, and the column output line is reset.

2. The apparatus of claim 1, wherein the output source follower transistor is connected to an output of the first capacitor and the second capacitor and a row selection transistor.

3. The apparatus of claim 2, wherein the pixel further comprises a reset storage switch connected between an output of the source follower transistor and the first capacitor Crst, and a reset read-out switch connected between the first capacitor and the output source follower transistor.

4. The apparatus of claim 3, wherein the pixel further comprises a signal storage switch connected between the output of the source follower transistor and the second capacitor, and a signal read-out switch connected between the second capacitor and the output source follower transistor.

5. The apparatus of claim 1, wherein the pixel further comprises:
a reset storage switch connected between the output of the source follower transistor and the first capacitor,
a signal storage switch, and
a signal read-out switch,
wherein the signal storage switch is connected between the output of the source follower transistor and the second capacitor, and the signal read-out switch is connected between the second capacitor and the output source follower transistor.

6. The apparatus of claim 1, wherein the pixel further comprises:
a reset storage switch connected between the output of the source follower transistor and the first capacitor,
a signal storage switch,
a signal read-out switch, wherein the signal storage switch is connected between the output of the source follower transistor and the second capacitor, and the signal read-out switch is connected between the second capacitor and the output source follower transistor, and
a storage switch connected between the input of the reset storage switch and the signal storage switch and the source follower transistor.

7. The apparatus of claim 1, wherein the column circuit comprises a read-out circuit including:
an amplifier, the inverse input terminal of which is connected to the column output line through an input capacitor;
a filter capacitor connected between the output terminal and the inverse input terminal of the amplifier;
an auto-zeroing switch connected between the output terminal Vout and the inverse input terminal Vinn of the amplifier,
wherein the input capacitor is controlled to be connected to the first capacitor when the column amplifier is in auto-zeroing, and to be connected to the first capacitor and the second capacitor when the column amplifier is in amplification.

8. The apparatus of claim 1, wherein the capacitance of the first capacitor is equal to that of the second capacitor.

9. The apparatus of claim 1, wherein the voltage of the inverse input terminal remains unchanged during the period of auto-zeroing and amplification.

10. The apparatus of claim 1, wherein the pixel array comprises a first pixel group corresponding to a first transfer voltage, and a second pixel group corresponding to a second transfer voltage.

11. An imaging method using the imaging apparatus as defined in claim 1, which, with respect to at least one of pixels in a pixel array arranged in rows and columns, comprises steps of:
resetting a storage area, generating a reset signal, and storing the reset signal to a first capacitor;
transferring a pixel signal in a photodiode to the storage area, generating a pixel signal, and storing the pixel signal to a second capacitor; and
obtaining the reset signal and the pixel signal from the first and the second capacitors, and deriving the difference between the reset signal and the pixel signal.

* * * * *

UNITED STATES PATENT AND TRADEMARK OFFICE
CERTIFICATE OF CORRECTION

| | | |
|---|---|---|
| PATENT NO. | : 10,116,890 B2 | Page 1 of 1 |
| APPLICATION NO. | : 15/452291 | |
| DATED | : October 30, 2018 | |
| INVENTOR(S) | : Xu et al. | |

It is certified that error appears in the above-identified patent and that said Letters Patent is hereby corrected as shown below:

In the Specification

Column 11, Line 29, replace the text 1QQ2 with 1002.

Column 11, Line 33, replace the text off with on.

Signed and Sealed this
Ninth Day of December, 2025

John A. Squires
*Director of the United States Patent and Trademark Office*